United States Patent
Douglas

[11] 3,901,074
[45] Aug. 26, 1975

[54] TECHNIQUE FOR MEASURING THE COMPLEX ELASTIC (YOUNG'S) MODULUS UTILIZING LASER INTERFEROMETRY

[75] Inventor: Bruce E. Douglas, Edgewater, Md.

[73] Assignee: The United States of America as represented by the Secretary of the Navy, Washington, D.C.

[22] Filed: Feb. 11, 1974

[21] Appl. No.: 441,536

[52] U.S. Cl............................. 73/92; 73/67.2
[51] Int. Cl.² ................. G01N 3/32; G01M 7/00
[58] Field of Search........ 356/106 R, 109, 110, 113, 356/32; 73/67, 67.1, 67.2, 71.3, 92

[56] References Cited
UNITED STATES PATENTS

| | | | |
|---|---|---|---|
| 3,319,460 | 5/1967 | Barigant | 73/67.2 |
| 3,417,608 | 12/1968 | Barigant | 73/67.1 |
| 3,699,808 | 10/1972 | Ford et al. | 73/91 |
| 3,734,623 | 5/1973 | Wolber | 356/110 |
| 3,756,074 | 9/1973 | Hedvig et al. | 73/99 |
| 3,782,184 | 1/1974 | Shuck | 73/101 |

*Primary Examiner*—Richard C. Queisser
*Assistant Examiner*—John P. Beauchamp
*Attorney, Agent, or Firm*—R. S. Sciascia; Q. E. Hodges

[57] ABSTRACT

The dynamic complex elastic modulus of a viscoelastic material is computed from three longitudinal deflection measurements on a prismatic rod of the material which is subjected to a compressional sinusoidal stress wave. A laser interferometer is proposed to make these deflection measurements in combination with reflecting mirrors which are located at the top, half and quarter positions of the sample rod. The rod is secured at one end and free at the distal end where the compressional stress wave is applied.

2 Claims, 2 Drawing Figures

TECHNIQUE FOR MEASURING THE COMPLEX ELASTIC (YOUNG'S) MODULUS UTILIZING LASER INTERFEROMETRY

The invention described herein may be manufactured and used by and for the Government of the United States of America for governmental purposes without the payment of any royalties thereon or therefor.

BACKGROUND AND SUMMARY

Viscoelastic materials are commercially utilized to damp mechanical vibrations in resonant structures. In general, the design of a damping treatment which utilizes these materials requires that two of the material's dynamic complex moduli be known as a function of frequency and temperature. The invention described herein is a method and apparatus of measuring one of these moduli, the complex elastic, or Young's, modules, which utilizes a laser interferometer to measure the longitudinal vibrational displacement at three positions on a sample of the material in the form of a viscoelastic prismatic rod which is subjected to a compressional sinusoidal stress load. The rod is fixed at one end and free at the other. Although several techniques exist for this type of measurement, the instant method is effective over a wide range of enviromental conditions, e.g., a wide range of temperatures under which the parameter can be determined. It offers a precise, nonresonant method for determining the complex elastic modulus of inherently damped materials which have a high real elastic modulus. Experimentally, this procedure places a negligible mechanical load on the test sample to minimize the effects of external mechanical loading on the test sample.

DETAILED DESCRIPTION

Figure 1:
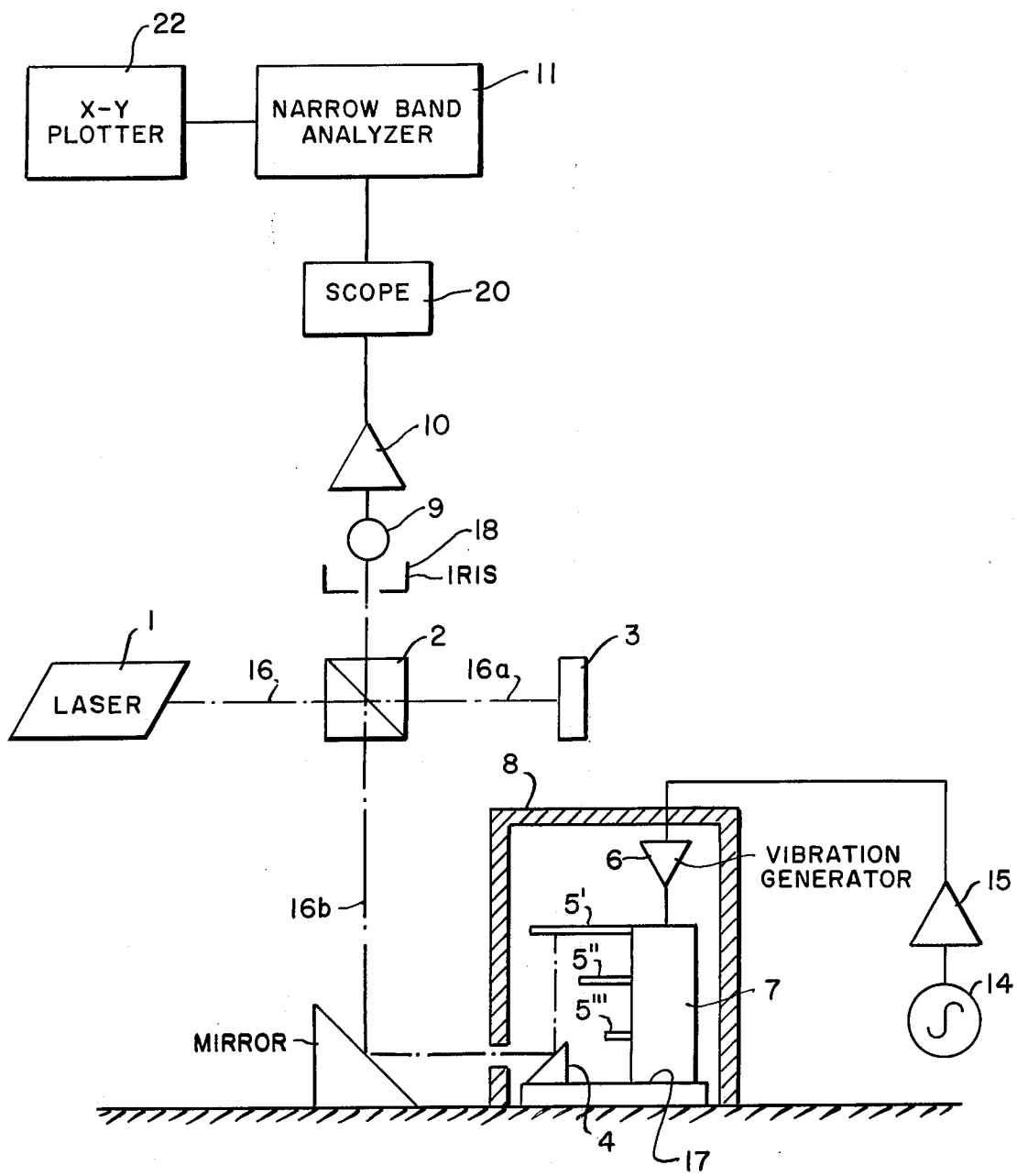
FIG. 1 is a schematic view of the apparatus used in this invention.

Referring to FIG. 1, laser 1 produces a coherent collimated beam of light 16 which is split at a beam splitter 2, the first beam 16a is reflected at a fixed mirror 3 back to the beam splitter where it recombines with the second beam 16b which is reflected from one of the mirrors 5', 5'', or 5''' which are attached to the viscoelastic sample. A mirror 4 is fixed against vibration, but slidable along base 17 to be positioned under mirror 5', 5'', or 5''' and redirects the second beam so that the mirrors at 5', 5'', 5''' can be attached to the rod 7 to measure longitudinal displacements. The second beam 16b is retroreflected from one of the mirrors 5', 5'', or 5''' back along the same path 16b. The two beams 16a and 16b then recombine at the beam splitter 2 where they produce interference fringes which are detected by a photodiode 9. It is to be understood that FIG. 1 shows for convenience only one example where the mirror 4 is under only one of the mirrors 5', but is slidable to positions under mirrors 5'' and 5'''. A vibration generator, e.g., a piezoelectric crystal or magnet driven by a coil, is mechanically attached to the viscoelastic prismatic rod 7 and driven by an oscillator 14 and power amplifier 15 to produce a compressional sinusoidal stress wave at the top of the rod 7. The rod is enclosed by an environmental control chamber 8. The three mirrors 5', 5'', and 5''' are attached to the rod having a length L, at the free end, i.e. at L, the half length position, L/2, and the quarter length position, L/4 from the fixed point of attachment of the rod, indicated at 17 in FIG. 1. The mirrors are bonded to the rod so that they are displaced as the point of attachment of the individual mirrors is displaced by the sinusoidal loading. A retroreflected beam of light from the motion of the mirrors 5', 5'', 5''' produce light interference fringes at the photodiode 9, after transmission through a conventional iris 18, and are related to the displacement of the mirrors during vibrational displacement. The interference fringes measured by the photodiode 9 is a measure of the longitudinal vibration deflection. The longitudinal displacement of the the sample rod 7 is designated $U_L$, $U_{L/2}$, and $U_{L/4}$ for the free end, half length and quarter length positions, respectively, in the equations set forth hereinafter.

The photodiode 9 electronically counts the fringes which gives a measure of the displacement of the attached mirrors 5. The time varying photodiode voltage is then amplified by amplifier 10, observed for adjustment on an oscilloscope 20, and filtered by filter 11 at the frequency of excitation of the rod or one of its harmonics (depending on the method used i.e. either the reference or ratio method to obtain displacement readings). Any of the standard techniques such as an X-Y plotter 22 for displaying and for calculating displacement from a suitably analyzed photodiode signal can then be employed to obtain the displacement of the mirrors 5', 5'', and 5''' which corresponds to the longitudinal displacement of the rod at the point of attachment. Except for the mirror attachments on the viscoelastic sample the above descripiton is just that of a standard laser interferometer. The points of attachment of the mirrors 5', 5'', 5''' on the sample rod 7 are critical to permit the use of the displacement measurements to determine the dynamic complex elastic modulus $E^*$.

Having obtained this set of three longitudinal deflection measurements $U_L$, $U_{L/2}$, $U_{L/4}$ by the standard methods described above, these readings can then be substituted into the expressions $$|R_2| = \frac{|U_{L/2}|}{|U_L|} ; \text{ and,}$$

$$|R_4| = \frac{|U_{L/4}|}{|U_{L/2}|}$$

to obtain $|R_2|$ and $|R_4|$ at the driving frequency, $f$, of the vibration generator. These values for $|R_2|$ and $|R_4|$ can then be substituted into the following expressions $$A' = \frac{1}{4} \frac{1}{|R_4|^2} ; \text{ and}$$

$$A'' = \frac{1}{4} \left( \frac{2}{|R_2|^2} + 8 - \frac{1}{|R_4|^4} \right)^{1/2}$$

to obtain values of $A'$ and $A''$, respectively. The values $A'$ and $A''$ together with knowledge of the mass density of the viscoelastic rod (which can be obtained by standard methods), the driving frequency, and the length of the rod can then be used to determine the elastic (Young's) storage modulus, $E'$, and the elastic (Young's) loss tangent, $d$, of the viscoelastic rod at the frequency which the rod was driven and at the temperature under which the measurements were made.

Figure 2:
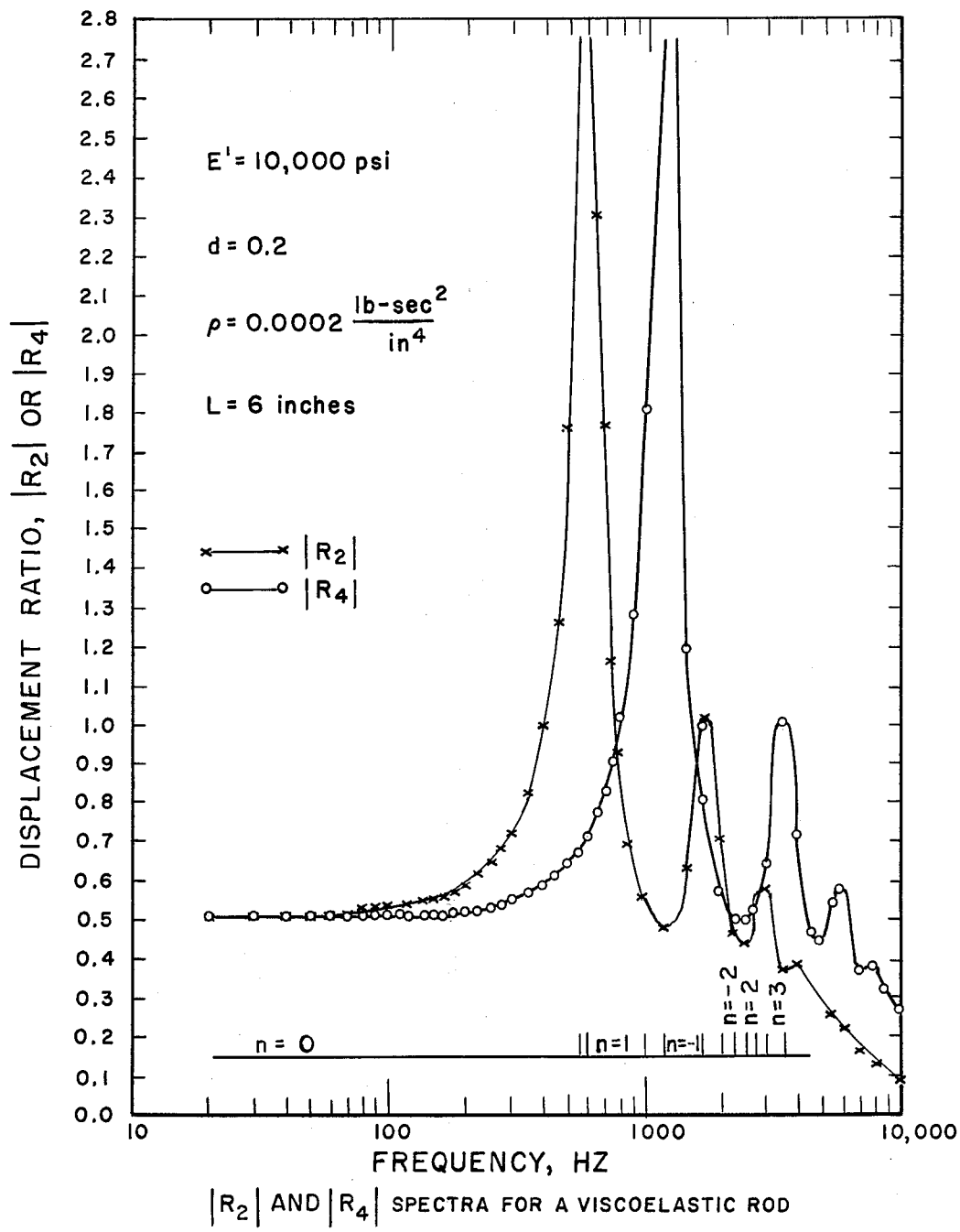
FIG. 2 is a graph of frequency versus $|R_2|$ and $|R_4|$ the displacement ratios for an example material.

A plot of frequency versus $|R_2|$ and $|R_4|$ is made from the displacement measurements, and an example of such a spectrum is shown in FIG. 2.

For frequencies up to the last maximum of $|R_4|$ spectrum the dynamic complex elastic modulus can be determined by:

$$E^* = \left[\frac{\pi^2 f^2 L^2 \rho}{(1+d^2)^{1/2}} \left\{\frac{\sin^2(1/2 \arctan d)}{[\cosh^{-1}(A'+A'')]^2}\right\}\right](1+id)$$

since $E^* = E'(1+id)$
and where:

$$d = 2\left\{\frac{\cos^{-1}(A'-A'') + n\pi}{\cosh^{-1}(A'+A'')} - \frac{\cosh^{-1}(A'+A'')}{\cos^{-1}(A'-A'') + n\pi}\right\}^{-1};$$

and, $$A' = \frac{1}{4|R_4|^2}$$

$$A'' = \frac{1}{4}\left\{\frac{2}{|R_4|^2} + 8 - \frac{1}{|R_4|^4}\right\}^{1/2};$$

$$|R_2| = \frac{U_{L/2}}{U_L};$$

$$|R_4| = \frac{U_{L/4}}{U_{L/2}};$$

$\rho$ = mass density of the rod;
$f$ = the frequency, in Hertz; and,
$n$ = an integer whose absolute value is equal to the number of maxima in the $|R_2|$ spectrum below the driving frequency $f$ and whose sign is opposite the sign of the slope of $|R_2|$ at frequency $f$.

For frequencies above the frequency of the last maximum of $|R_4|$ determine the dynamic complex elastic modulus $E^*$ according to the following relationship:

$$E^* = \frac{c^2 \rho}{(1+d^2)^{1/2}}(1+id)$$

where, $$d = \tan 2\left\{\arcsin\left(\frac{-c}{\pi f L}\ln|R_2|\right)\right\};$$

where;

$c$ = the velocity of the longitudinal wave at frequency, $f$, measured by well known laser interferometric techniques.

Some modifications and variations of the present invention are possible in light of the above teachings. It is therefore to be understood that the invention may be practiced otherwise than as specifically described.

What is claimed is:

1. A method for measuring the dynamic complex elastic modulus of a viscoelastic material comprising the steps of:

fixedly mounting a prismatic rod of the material of length L at one of its ends;
 maintaining the rod at a predetermined temperature;
 introducing a sinusoidal longitudinal stress wave of a selected number of frequencies within a predetermined range of frequencies into the rod;
 measuring the deflection, $U_L$, of the rod at its free end, at a point midway its length $U_{L/2}$, and at a point one quarter of the length of the rod from its fixed end, $U_{L/4}$, for each of the selected frequencies;
 A. for frequencies below the last maximum in $|R_4|$ determine the complex elastic modulus, $E^*$ for the given frequency $f$ according to the following relationship $$E^* = \left[\frac{\pi^2 f^2 L^2 \rho}{(1+d^2)^{1/2}}\left\{\frac{\sin^2(1/2 \arctan d)}{[\cosh^{-1}(A'+A'')]^2}\right\}\right](1+id)$$

where:

$$d = 2\left\{\frac{\cos^{-1}(A'-A'') + n\pi}{\cosh^{-1}(A'+A'')} - \frac{\cosh^{-1}(A'+A'')}{\cos^{-1}(A'-A'') + n\pi}\right\}^{-1}$$

$$A' = \frac{1}{4|R_4|^2}$$

$$A'' = \frac{1}{4}\left[\frac{2}{|R_2|^2} + 8 - \frac{1}{R_4^4}\right]^{1/2}$$

$$|R_2| = \frac{U_{L/2}}{U_L};$$

$$|R_4| = \frac{U_{L/4}}{U_{L/2}};$$

$\rho$ = mass density of the rod
$f$ = the frequency in Hertz; and
$n$ = *an integer determined at the given frequency, $f$, such that the absolute value of $n$ equals the number of peaks in $|R_2|$ for the $|R_2|$ spectrum below frequency $f$ and the sign of $n$ is opposite the sign of the slope of $|R_2|$ for values of $f$ up to the last maximum in $R_4|$;*

B. for frequencies above the last maximum in $|R_4|$ determine the complex elastic modulus $E^*$ according to the following relationship:

$$E^* = \frac{c^2 \rho}{(1+d^2)^{1/2}}(1+id)$$

where;

$$d = \tan\left\{2\arcsin\left(\frac{-c}{\pi f L}\ln|R_2|\right)\right\};$$

$c$ = the velocity of the longitudinal wave at frequency $f$.

2. An apparatus for measuring the displacement of a sample rod of viscoelastic material under sinusoidal longitudinal compression waves at lineal points critical for the determination of the dynamic complex modulus of elasticity of the material, comprising:

an environmental housing for enclosing the sample rod and controlling the temperature thereof;
 means for securing one end of said rod in said environmental housing;
 means attached to the unconstrained end of the sample rod for introducing sinusoidal compression stress waves therein;
 means for producing a beam of collimated light and introducing the same into said environmental housing to impinge upon said sample rod;

means for splitting said beam of collimated light into two beams, said means interposed along said beam of light;

means for reflecting one of said split beams, mounted perpendicularly along the length of said sample rod, one for successively measuring the longitudinal displacement of said sample rod along the length thereof at the unconstrained end, another at a point midway along its length, and still another at a point one-quarter the length from the secured end;

means for combining said split beams reflected from said reflecting means with the other of said split beams; and means for counting the interference fringes produced by the combining means thus determining the displacement of each of said reflecting means at the selected frequency.

* * * * *